(12) United States Patent
Aflatooni et al.

(10) Patent No.: US 8,988,440 B2
(45) Date of Patent: Mar. 24, 2015

(54) INACTIVE DUMMY PIXELS

(75) Inventors: Koorosh Aflatooni, Cupertino, CA (US); Farnaz Parhami, Fremont, CA (US); Suryaprakash Ganti, Sunnyvale, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 199 days.

(21) Appl. No.: 13/329,502

(22) Filed: Dec. 19, 2011

(65) Prior Publication Data

US 2012/0236009 A1 Sep. 20, 2012

Related U.S. Application Data

(60) Provisional application No. 61/453,089, filed on Mar. 15, 2011.

(51) Int. Cl.
| | | |
|---|---|---|
| *G09G 5/00* | (2006.01) | |
| *H01L 33/08* | (2010.01) | |
| *G06T 1/00* | (2006.01) | |
| *G02B 26/00* | (2006.01) | |

(52) U.S. Cl.
CPC .................................. *G02B 26/001* (2013.01)
USPC .............................. 345/501; 438/29; 345/212

(58) Field of Classification Search
CPC .................................................... G02B 26/001
See application file for complete search history.

(56) References Cited

U.S. PATENT DOCUMENTS

| | | | |
|---|---|---|---|
| 6,980,350 B2 | 12/2005 | Hung et al. | |
| 7,311,577 B2 | 12/2007 | Park et al. | |
| 7,402,803 B1 * | 7/2008 | Wagner et al. | 250/338.3 |
| 7,450,209 B2 | 11/2008 | Wu et al. | |
| 7,522,236 B2 * | 4/2009 | Gettemy et al. | 349/114 |
| 7,626,669 B2 | 12/2009 | Lim et al. | |
| 7,706,052 B2 * | 4/2010 | Kang et al. | 359/296 |
| 7,719,752 B2 * | 5/2010 | Sampsell et al. | 359/290 |
| 7,755,268 B2 * | 7/2010 | Chang et al. | 313/495 |
| 8,004,514 B2 * | 8/2011 | Sampsell | 345/212 |

(Continued)

FOREIGN PATENT DOCUMENTS

| | | |
|---|---|---|
| EP | 1640773 | 3/2006 |
| EP | 1990671 | 11/2008 |

(Continued)

OTHER PUBLICATIONS

Philips, Luxeon Rebel Assembly and Handling Information, 2008.*

(Continued)

*Primary Examiner* — Devona Faulk
*Assistant Examiner* — Charles L Beard
(74) *Attorney, Agent, or Firm* — Weaver Austin Villeneuve & Sampson

(57) ABSTRACT

This disclosure provides systems, methods and apparatus, including computer programs encoded on computer storage media, for a display with inactive dummy pixels. A display apparatus may include subpixels having a first electrode layer and a second electrode layer. The first electrode layer of an edge subpixel may include an opening, which may be made large enough to prevent the edge subpixel from actuating. The size of the openings also may be selected to attain a desired overall reflectivity for an array of edge subpixels. For example, the size of the openings may be selected to make the reflectivity of an edge pixel array similar to the reflectivity of a routing area.

22 Claims, 12 Drawing Sheets

(56) References Cited

U.S. PATENT DOCUMENTS

| | | | |
|---|---|---|---|
| 8,035,588 B2 | 10/2011 | Pan et al. | |
| 8,148,790 B2* | 4/2012 | Morris et al. | 257/415 |
| 8,231,423 B2 | 7/2012 | Chan et al. | |
| 8,395,569 B2 | 3/2013 | Min et al. | |
| 2002/0050958 A1* | 5/2002 | Matthies et al. | 345/55 |
| 2004/0017534 A1 | 1/2004 | Miki et al. | |
| 2004/0051929 A1* | 3/2004 | Sampsell et al. | 359/247 |
| 2004/0100191 A1* | 5/2004 | Park | 313/506 |
| 2004/0218128 A1* | 11/2004 | Matsuyama et al. | 349/123 |
| 2005/0078240 A1* | 4/2005 | Murade | 349/110 |
| 2005/0146771 A1* | 7/2005 | Shih | 359/291 |
| 2006/0011813 A1 | 1/2006 | Park et al. | |
| 2006/0066504 A1* | 3/2006 | Sampsell et al. | 345/1.1 |
| 2006/0066595 A1* | 3/2006 | Sampsell et al. | 345/204 |
| 2006/0066935 A1* | 3/2006 | Cummings et al. | 359/291 |
| 2006/0067650 A1* | 3/2006 | Chui | 385/147 |
| 2006/0077127 A1* | 4/2006 | Sampsell et al. | 345/55 |
| 2006/0082856 A1* | 4/2006 | Patel et al. | 359/290 |
| 2007/0019280 A1* | 1/2007 | Sasagawa et al. | 359/315 |
| 2007/0019922 A1* | 1/2007 | Sasagawa et al. | 385/147 |
| 2007/0019923 A1* | 1/2007 | Sasagawa et al. | 385/147 |
| 2007/0029929 A1 | 2/2007 | Nakamura et al. | |
| 2007/0146518 A1* | 6/2007 | Hong et al. | 348/308 |
| 2007/0194630 A1* | 8/2007 | Mignard et al. | 310/10 |
| 2007/0200839 A1* | 8/2007 | Sampsell | 345/204 |
| 2008/0151352 A1* | 6/2008 | Chung et al. | 359/290 |
| 2008/0273233 A1 | 11/2008 | Pan | |
| 2009/0073539 A1* | 3/2009 | Mignard | 359/291 |
| 2009/0103161 A1* | 4/2009 | Kothari et al. | 359/245 |
| 2009/0103165 A1* | 4/2009 | Kothari et al. | 359/290 |
| 2009/0126777 A1* | 5/2009 | Khazeni et al. | 136/246 |
| 2009/0201453 A1* | 8/2009 | Obi et al. | 349/128 |
| 2009/0231255 A1* | 9/2009 | Tanimoto et al. | 345/87 |
| 2009/0303746 A1* | 12/2009 | Wang et al. | 362/625 |
| 2010/0019336 A1* | 1/2010 | Sasagawa et al. | 257/432 |
| 2010/0039696 A1* | 2/2010 | de Groot et al. | 359/291 |
| 2010/0134503 A1* | 6/2010 | Sampsell et al. | 345/522 |
| 2010/0147790 A1* | 6/2010 | Sasagawa et al. | 216/17 |
| 2010/0149627 A1* | 6/2010 | Sasagawa et al. | 359/291 |
| 2010/0202038 A1* | 8/2010 | Chung et al. | 359/291 |
| 2010/0238572 A1* | 9/2010 | Tao et al. | 359/849 |
| 2010/0302218 A1* | 12/2010 | Bita et al. | 345/204 |
| 2010/0302616 A1* | 12/2010 | Bita et al. | 359/291 |
| 2010/0302803 A1* | 12/2010 | Bita et al. | 362/606 |
| 2010/0309572 A1 | 12/2010 | Mignard | |
| 2011/0105185 A1* | 5/2011 | Heald | 455/566 |
| 2011/0115762 A1* | 5/2011 | Sasagawa et al. | 345/204 |
| 2011/0261046 A1* | 10/2011 | Govil et al. | 345/212 |
| 2011/0298815 A1* | 12/2011 | Sampsell | 345/553 |
| 2012/0062615 A1* | 3/2012 | Van Lier et al. | 345/690 |
| 2012/0092747 A1* | 4/2012 | Martin et al. | 359/290 |
| 2012/0098847 A1* | 4/2012 | Parmar et al. | 345/589 |
| 2012/0170102 A1* | 7/2012 | Payne et al. | 359/291 |
| 2012/0194896 A1* | 8/2012 | Kothari et al. | 359/290 |
| 2012/0235968 A1* | 9/2012 | Todorovich et al. | 345/208 |
| 2012/0235985 A1* | 9/2012 | Chuei et al. | 345/214 |
| 2012/0236042 A1* | 9/2012 | Parmar et al. | 345/690 |
| 2012/0236049 A1* | 9/2012 | Todorovich et al. | 345/694 |
| 2012/0248478 A1* | 10/2012 | Lee et al. | 257/91 |
| 2012/0249519 A1* | 10/2012 | Cummings | 345/214 |
| 2012/0249558 A1* | 10/2012 | Lee et al. | 345/501 |
| 2012/0268430 A1* | 10/2012 | Tao et al. | 345/204 |
| 2012/0274666 A1* | 11/2012 | Aflatooni et al. | 345/690 |
| 2012/0314545 A1* | 12/2012 | Sampsell | 368/228 |
| 2013/0046803 A1* | 2/2013 | Parmar et al. | 708/203 |
| 2013/0100099 A1* | 4/2013 | Chuei et al. | 345/208 |
| 2013/0100100 A1* | 4/2013 | Parmar et al. | 345/209 |
| 2013/0100107 A1* | 4/2013 | Lee et al. | 345/212 |
| 2013/0100109 A1* | 4/2013 | Lee et al. | 345/212 |
| 2013/0120465 A1* | 5/2013 | Govil et al. | 345/690 |
| 2013/0127881 A1* | 5/2013 | Lewis et al. | 345/501 |
| 2013/0127926 A1* | 5/2013 | Lewis et al. | 345/690 |
| 2013/0135318 A1* | 5/2013 | Narayanan et al. | 345/501 |

FOREIGN PATENT DOCUMENTS

| | | | | |
|---|---|---|---|---|
| EP | 2058276 A2 | 5/2009 | | |
| GB | 2434877 A | 8/2007 | | |
| JP | 2002350751 A | 12/2002 | | |
| JP | 2004212656 | 7/2004 | | |
| WO | WO 2007120885 A2 * | 10/2007 | | B81B 7/00 |
| WO | WO 2009015231 A1 * | 1/2009 | | G02B 26/00 |
| WO | WO2010029793 A1 | 3/2010 | | |
| WO | 2010/098368 | 9/2010 | | |
| WO | WO2010111153 A2 | 9/2010 | | |
| WO | WO2010111431 A2 | 9/2010 | | |

OTHER PUBLICATIONS

Ha, Thermal Analysis of High Power LED Arrays, Georgia Institute of Technology, 2009.*
Hirokazu, JP2002350751, 2002.*
International Search Report and Written Opinion—PCT/US2012/028938—ISA/EPO—Sep. 14, 2012.
Written Opinion of the International Preliminary Examining Authority—PCT/US2012/028938—European Patent Office, Mar. 14, 2013, 9 pp.
International Search Report and Written Opinion—PCT/US2012/030579—ISA/EPO—Jul. 5, 2012.
Partial International Search Report—PCT/US2012/028938—ISA/EPO—Jun. 4, 2012.
Suzuki J., et al., "Micro-mirror on Ribbon-actuator (MOR) for high speed spatial light modulator", IEEE 21st International Conference on Micro Electro Mechanical Systems, 2008: MEMS 2008; Jan. 13-17, 2008, Tucson, Arizona, USA, Piscataway, NJ: IEEE Operations Center, Jan. 1, 2008.pp. 762-765, XP031210858, DOI: 10.1109/MEMSYS.2008.4443768 ISBN: 978-1-4244-1792-6 *5. Demonstration* figure 8.
U.S. Office Action dated Aug. 8, 2013, from U.S. Appl. No. 13/074,799.
U.S. Appl. No. 61/453,089, filed Mar. 15, 2011, Entitled "Inactive Dummy Pixels".
U.S. Appl. No. 13/074,799, entitled "Dummy Pixels Made Inactive" Filed Mar. 29, 2011, by William J. Cummings.
Japanese Office Action Dated Oct. 21, 2014 in Application No. 2013-558119.

* cited by examiner

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

US 8,988,440 B2

INACTIVE DUMMY PIXELS

CLAIM TO PRIORITY

This application claims priority to U.S. Provisional Application No. 61/453,089, filed on Mar. 15, 2011 and entitled "Inactive Dummy Pixels," which is hereby incorporated by reference and for all purposes.

TECHNICAL FIELD

This disclosure relates to display devices, including but not limited to display devices that incorporate electromechanical systems.

DESCRIPTION OF THE RELATED TECHNOLOGY

Electromechanical systems (EMS) include devices having electrical and mechanical elements, actuators, transducers, sensors, optical components (including mirrors) and electronics. EMS can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). As used herein, the term IMOD or interferometric light modulator refers to a device that selectively absorbs and/or reflects light using the principles of optical interference. In some implementations, an IMOD may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the IMOD. IMOD devices have a wide range of applications, and are anticipated to be used in improving existing products and creating new products, especially those with display capabilities.

In many displays, pixels are made uniform throughout the display except at the edge. The same basic masks, processes, etc., are generally used to make all other pixels. However, edge pixels are treated differently. For example, in some implementations, edge pixels are the only pixels in an array that do not have the same types of structures on both sides.

In general, these edge pixels are not used as part of the "active area" of pixels that is used for the display. In some pixel arrays, photo-resist or black mask material may be used to obscure the edge pixels. Some edge pixels may draw power, move, etc., even though they are not part of the active display area.

SUMMARY

The systems, methods and devices of the disclosure each have several innovative aspects, no single one of which is solely responsible for the desirable attributes disclosed herein.

One innovative aspect of the subject matter described in this disclosure can be implemented in a display apparatus. The display apparatus may include subpixels having a first electrode layer and a second electrode layer. The first electrode layer of an edge subpixel may include an opening. The size of the opening may be selected to attain a desired actuation voltage for the edge subpixel. In some implementations, the opening may be made large enough to prevent the edge subpixel from actuating. For example, the desired actuation voltage may be greater than a voltage that will be applied between the first electrode layer and the second electrode layer in an active area of the display.

The size of the openings also may be selected to attain a desired overall reflectivity for an array of edge subpixels. For example, the size of the openings may be selected to make an edge pixel array appear similar to the routing area. The openings may cause the edge subpixels to have a first reflectivity that is substantially similar to a second reflectivity of a routing area.

Another innovative aspect of the subject matter described in this disclosure can be implemented in an apparatus that includes a routing area, an active subpixel array including a plurality of active subpixels, an array driver and an edge subpixel array. The edge subpixel array may include a plurality of edge subpixels configured to provide electrical connectivity between the routing area and the active subpixel array. Each of the edge subpixels and the active subpixels may include a first conductive layer and a second conductive and reflective layer. The first conductive layer of the edge subpixels may have an opening formed therein that is large enough to prevent the edge subpixels from actuating when the array driver is applying an active subpixel actuation voltage to the active subpixel array via the edge subpixels.

The opening may cause the edge subpixels to have an edge subpixel actuation voltage that is higher than the active subpixel actuation voltage. The opening may allow ambient light to reflect directly from the second conductive and reflective layer of the edge subpixels and emerge from the edge subpixels. The opening may cause the edge subpixels to have a reflectivity that is substantially similar to a reflectivity of the routing area.

The apparatus may include a display and a processor that is configured to communicate with the display. The processor may be configured to process image data. The apparatus may include a memory device that is configured to communicate with the processor. The apparatus may include a driver circuit configured to send at least one signal to the display and a controller configured to send at least a portion of the image data to the driver circuit. The apparatus may include an image source module configured to send the image data to the processor. The image source module may include at least one of a receiver, transceiver, and transmitter. The apparatus may include an input device configured to receive input data and to communicate the input data to the processor.

Another innovative aspect of the subject matter described in this disclosure can be implemented in a method that involves forming an optical stack over a substrate. The optical stack may include a first conductive layer. The method may involve forming a plurality of support structures on the optical stack or on the substrate, forming a second conductive and reflective layer on the support structures, and forming an array of active subpixels that include the first conductive layer, the support structures and the second conductive and reflective layer such that the second conductive and reflective layer is movable between a first position and a second position when an active subpixel actuation voltage is applied to the active subpixels.

The method may involve forming a routing area outside the array of active subpixels and forming an edge subpixel array including rows and columns of edge subpixels. The edge subpixels may be configured to provide electrical connectivity between the routing area and the active subpixels. Each of the edge subpixels may include the first conductive layer, the second and reflective conductive layer and the support structures. The edge subpixels may include an opening in the first conductive layer that is large enough to prevent the edge subpixels from actuating when the actuation voltage is applied to the active subpixels.

The process of forming the edge subpixel array may include forming the opening in each edge subpixel. The process of forming the edge subpixel array may include forming the openings to prevent the edge subpixels from modulating incident light. The routing area may have a routing area reflectivity. The process of forming the edge subpixel array may involve forming the opening to make the edge subpixel area reflectivity substantially match the routing area reflectivity.

Another innovative aspect of the subject matter described in this disclosure can be implemented a non-transitory medium having software encoded thereon. The software may include instructions for controlling at least one device to receive data indicating an actuation voltage for an array of active subpixels and to determine a size of an opening in a first conductive layer of a plurality of edge subpixels that include the first conductive layer and a second conductive layer. The edge subpixels may be configured for electrical connectivity with the active subpixels. The determining process may involve determining a minimum opening size to prevent the edge subpixels from actuating when the actuation voltage is applied to the active subpixels via the edge subpixels.

The software may include instructions for controlling the at least one device to determine an edge subpixel area reflectivity of an array of edge subpixels each having an opening of the minimum opening size. Determining the edge subpixel area reflectivity may involve calculating the edge subpixel area reflectivity. Determining the edge subpixel area reflectivity may involve receiving data indicating the edge subpixel area reflectivity.

The software may include instructions for controlling the at least one device to determine a routing area reflectivity of a routing area adjacent to the array of edge subpixels and/or to determine a reflectivity difference between the edge subpixel area reflectivity and the routing area reflectivity. The software may include instructions for controlling the at least one device to receive an indication of a desired reflectivity difference and to determine whether the reflectivity difference is greater than, less than or equal to the desired reflectivity difference. If it is determined that the reflectivity difference is greater than the desired reflectivity difference, the software may include instructions for controlling the at least one device to determine whether there is a modified opening size that would yield a reflectivity difference that is less than or equal to the desired reflectivity difference. If it is determined that there is a modified opening size that would yield a reflectivity difference that is less than or equal to the desired reflectivity difference, wherein the software includes instructions for controlling the at least one device to determine whether the modified opening size is greater than or equal to the minimum opening size.

Another innovative aspect of the subject matter described in this disclosure can be implemented in a device that includes routing apparatus having a routing area reflectivity and active subpixel apparatus including a first conductive layer and a second conductive and reflective layer. The active subpixel apparatus may include apparatus for controlling an optical cavity by moving the second conductive and reflective layer from a first position to a second position. The device may include array driver apparatus and edge subpixel apparatus for providing electrical connectivity between the routing apparatus and the active subpixel apparatus.

The edge subpixel apparatus may include reflectivity modulation apparatus for causing a reflectivity difference between an edge subpixel area reflectivity and the routing area reflectivity to be less than or equal to a desired reflectivity difference. The reflectivity modulation apparatus may include apparatus for preventing actuation of edge subpixels in the edge subpixel area. The reflectivity modulation apparatus may include openings in edge subpixels in the edge subpixel area.

Details of one or more implementations of the subject matter described in this specification are set forth in the accompanying drawings and the description below. Although the examples provided in this summary are primarily described in terms of MEMS-based displays, the concepts provided herein apply to other types of displays, such as organic light-emitting diode ("OLED") displays and field emission displays. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
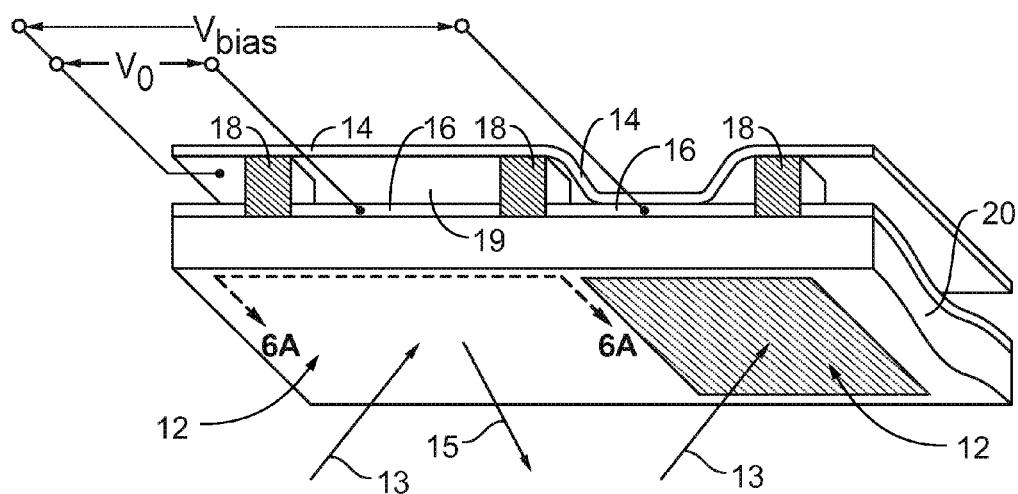
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some edge pixels may draw power, move, etc., even though they are not part of the active display area. For example, some displays actively drive the edge pixels using a separate drive scheme from that of the pixels in the active display area. Driving the edge pixels in this manner can waste power and add complexity. Other displays include a layer of black mask material that obscures the edge subpixels.

According to some implementations provided herein, edge subpixels of passively-addressed displays are inactive "dummy" subpixels. Some such implementations are made inactive by including an opening in a first electrode layer of each of the edge subpixels. The size of the opening may be selected to attain a desired actuation voltage for the edge subpixel. In some implementations, the opening may be made large enough to prevent the edge subpixel from actuating. For example, the desired actuation voltage may be greater than a voltage that will be applied between the first electrode layer and the second electrode layer in an active area of the display.

The opening may allow reflected light from a second and more reflective electrode layer to emerge from the edge subpixels. Therefore, edge subpixels that include such openings may be more reflective than edge subpixels without such openings. The size of the openings may be selected to attain a desired overall reflectivity for an array of edge subpixels. For example, the size of the openings may be selected, at least in part, to make the reflectivity of the edge subpixels similar to the reflectivity of the nearby routing area.

Particular implementations of the subject matter described in this disclosure can be implemented to realize one or more of the following potential advantages. Because the openings cause the edge subpixels to become inactive, the edge subpixels do not draw power and do not require a separate drive scheme. Therefore, displays that include edge subpixels as described herein may be more energy efficient and may be somewhat simpler to operate.

If the reflectivity of the edge subpixels is made similar to the reflectivity of the routing area by adding openings to the edge subpixels, a display that includes such edge subpixels does not require a black mask to obscure the edge subpixels. Omitting this black mask material is more cost-effective and also can result in functional improvements. For example, such implementations can reduce yield loss due to an oxide breakdown that can otherwise occur between the black mask layer and an electrode layer of the edge subpixels.

In addition, the visual appearance of the edge subpixels can be independent of the driving voltages in the active array and therefore the edge subpixels may be suitable to use as a uniform view area border of the display. In some drive schemes, it is not possible to predict the behavior of ordinary subpixels that are not fully addressed (valid waveforms on both row and column). Various implementations described herein obviate the requirement of having extra driver outputs to control the visual appearance of the edge subpixels.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the IMOD. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent IMODs 12 (i.e., IMOD pixels). In the IMOD 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near, adjacent or touching the optical stack 16. The voltage $V_{bias}$ applied across the IMOD 12 on the right is sufficient to move and can maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. A person having ordinary skill in the art will readily recognize that most of the light 13 incident upon the pixels 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, more electrically conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be approximately less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
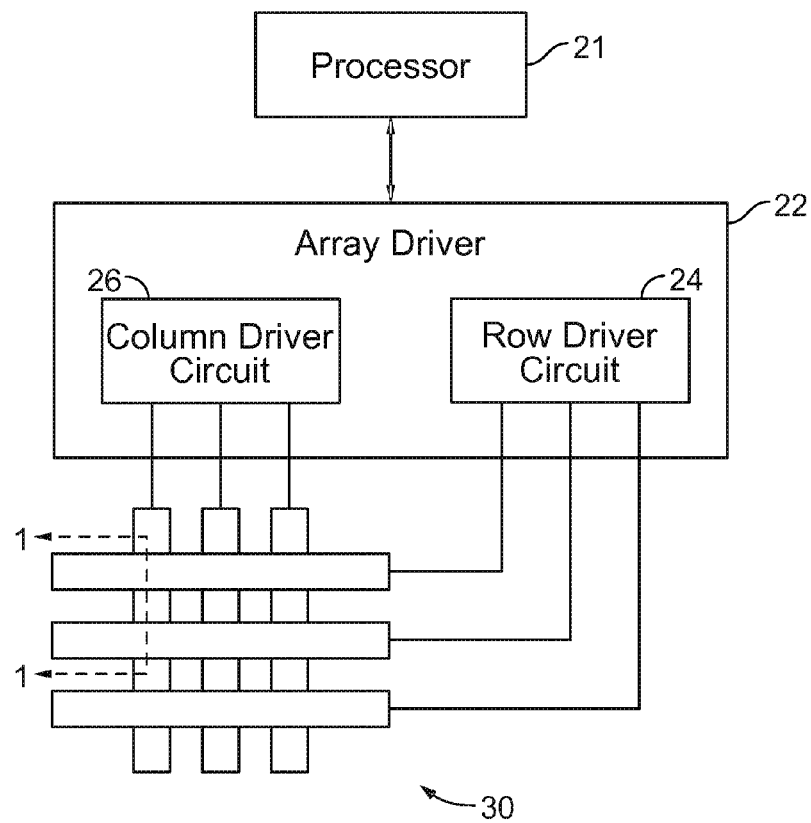
FIG. 2 shows an example of a system block diagram illustrating an electronic device incorporating a 3×3 IMOD display.

FIG. 2 shows an example of a system block diagram illustrating an electronic device incorporating a 3×3 IMOD display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
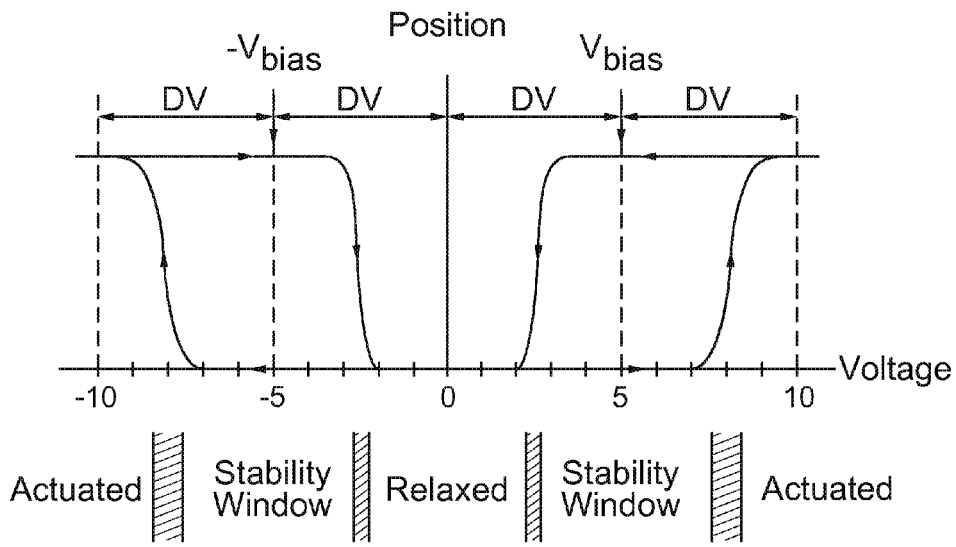
FIG. 3 shows an example of a diagram illustrating movable reflective layer position versus applied voltage for the IMOD of FIG. 1.
FIG. 4 shows an example of a table illustrating various states of an IMOD when various common and segment voltages are applied.

FIG. 3 shows an example of a diagram illustrating movable reflective layer position versus applied voltage for the IMOD of FIG. 1. For MEMS IMODs, the row/column (i.e., common/segment) write procedure may take advantage of a hysteresis property of these devices as illustrated in FIG. 3. An IMOD may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an IMOD when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all IMOD elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the IMOD will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_D}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
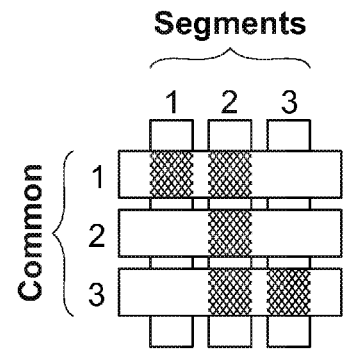
FIG. 5A shows an example of a diagram illustrating a frame of display data in the 3×3 IMOD display of FIG. 2.
Figure 5B:
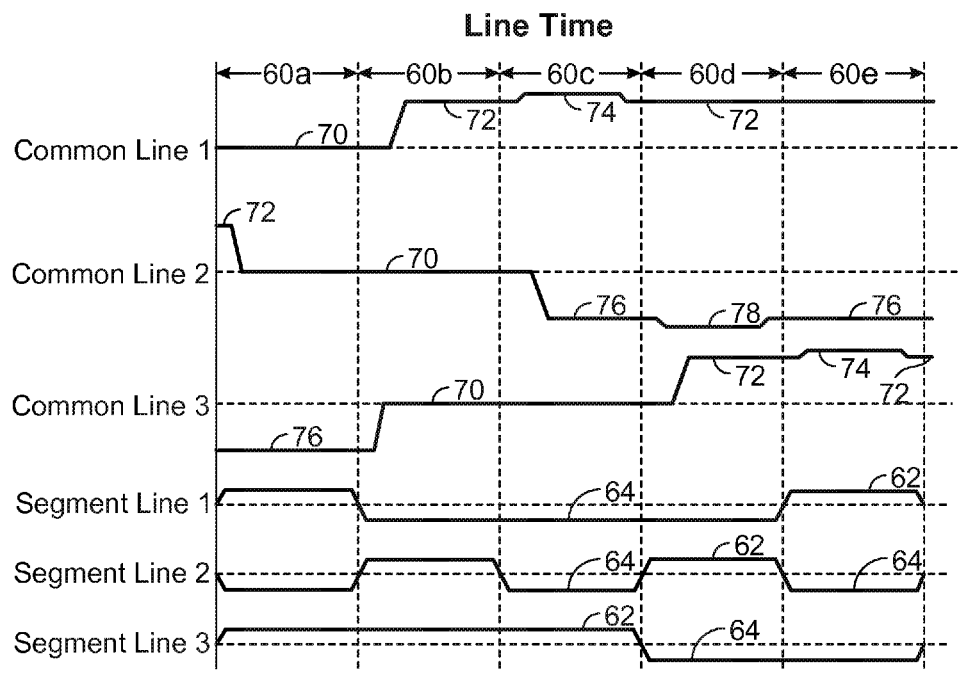
FIG. 5B shows an example of a timing diagram for common and segment signals that may be used to write the frame of display data illustrated in FIG. 5A.

FIG. 5A shows an example of a diagram illustrating a frame of display data in the 3×3 IMOD display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the IMODs, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
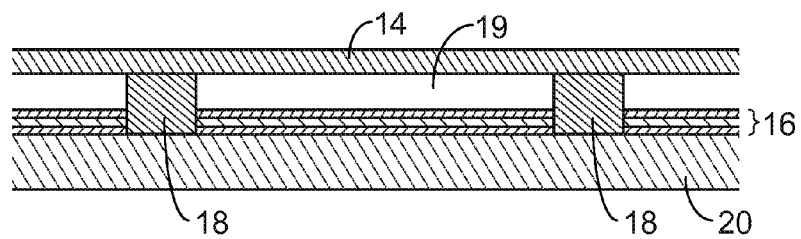
FIG. 6A shows an example of a partial cross-section of the IMOD display of FIG. 1.
Figure 6B:
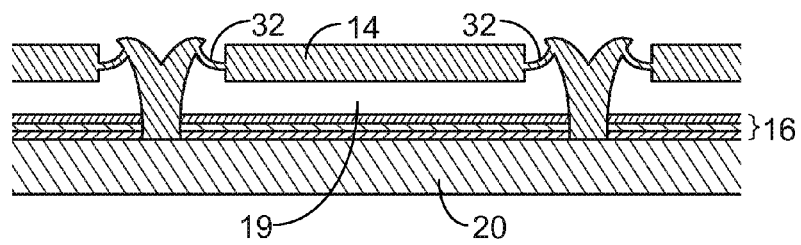
FIGS. 6B-6E show examples of cross-sections of varying implementations of IMODs.
Figure 6C:
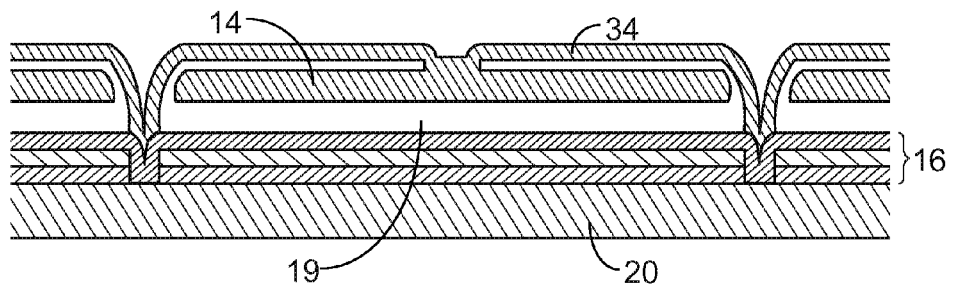

The details of the structure of IMODs that operate in accordance with the principles set forth above may vary widely. For example, FIGS. 6A-6E show examples of cross-sections of varying implementations of IMODs, including the movable reflective layer 14 and its supporting structures. FIG. 6A shows an example of a partial cross-section of the IMOD display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
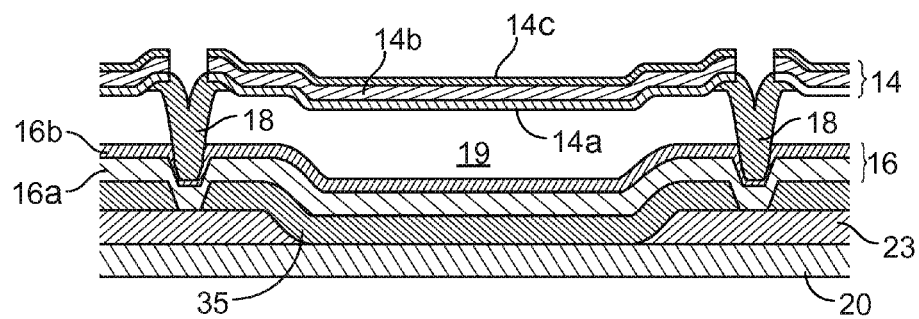

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
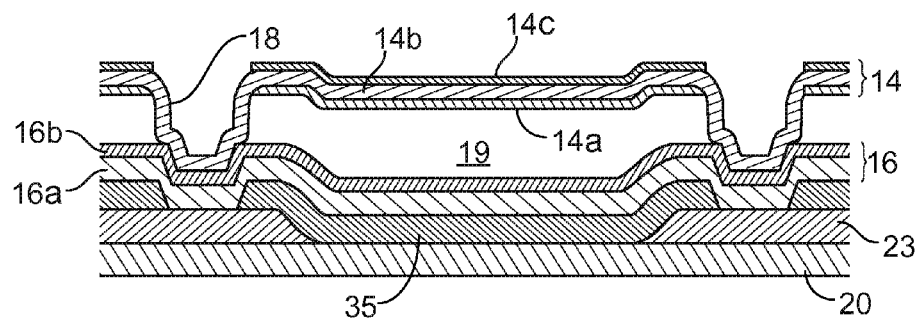

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the IMOD is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
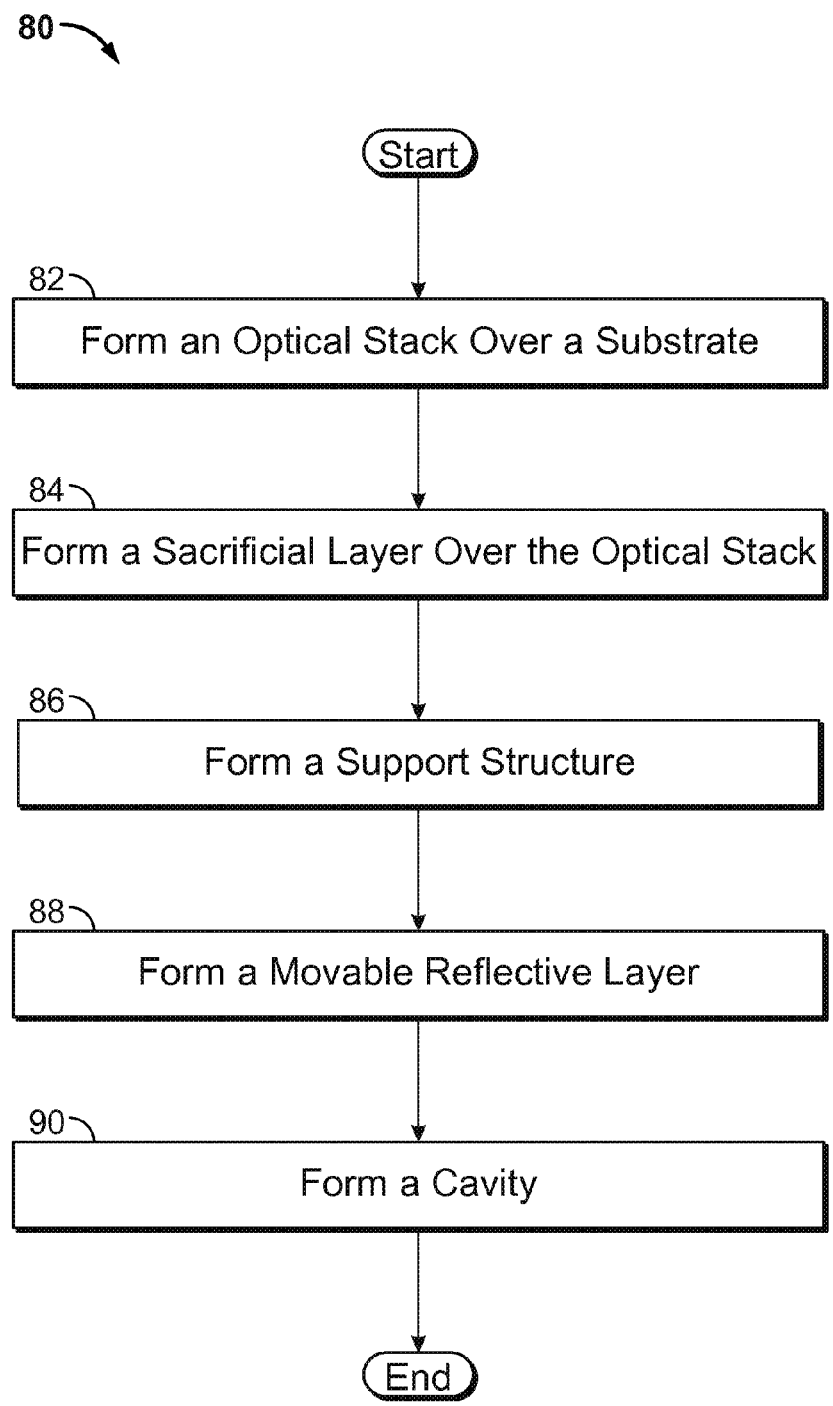
FIG. 7 shows an example of a flow diagram illustrating a manufacturing process for an IMOD.
Figure 8A:
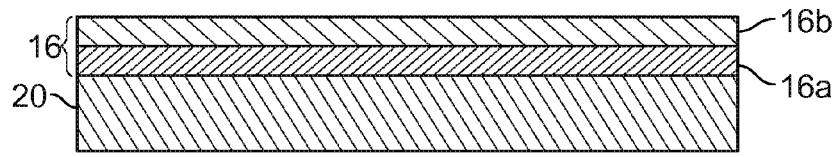
FIGS. 8A-8E show examples of cross-sectional schematic illustrations of various stages in a method of making an IMOD.

FIG. 7 shows an example of a flow diagram illustrating a manufacturing process 80 for an IMOD, and FIGS. 8A-8E show examples of cross-sectional schematic illustrations of corresponding stages of such a manufacturing process 80. In some implementations, the manufacturing process 80 can be implemented to manufacture, e.g., IMODs of the general type illustrated in FIGS. 1 and 6A-6E, in addition to other blocks not shown in FIG. 7. In this example, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
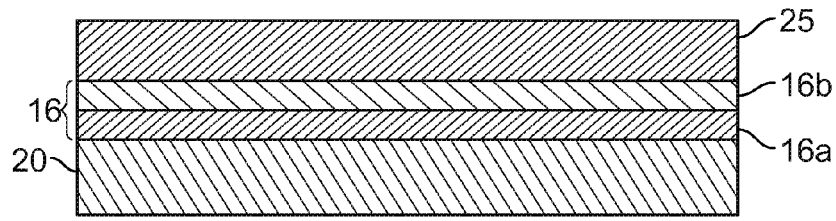

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting IMODs 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
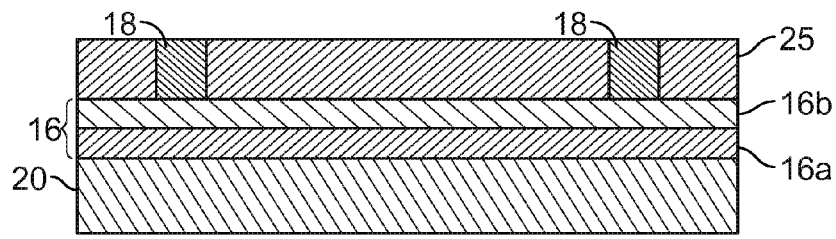

The process 80 continues at block 86 with the formation of a support structure e.g., a post 18 as illustrated in FIGS. 1, 6A and 8C. The formation of the post 18 may include patterning the sacrificial layer 25 to form a support structure aperture, then depositing a material (e.g., a polymer or an inorganic material, such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
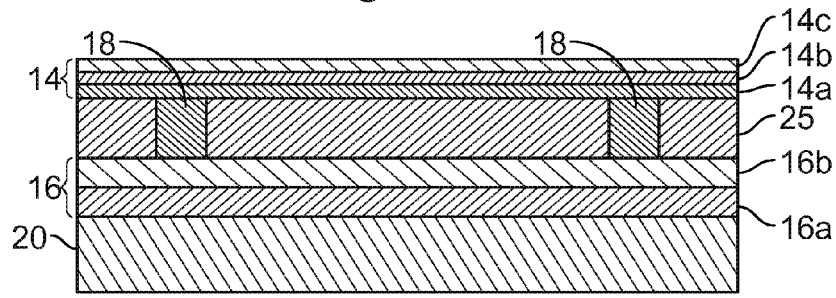
Figure 8E:
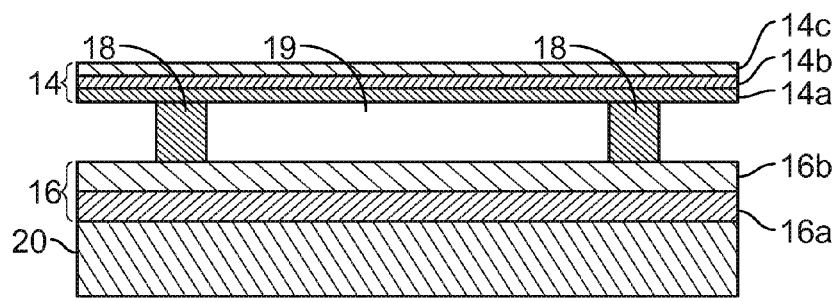

The process 80 continues at block 88 with the formation of a movable reflective layer or membrane such as the movable reflective layer 14 illustrated in FIGS. 1, 6A and 8D. The movable reflective layer 14 may be formed by employing one or more deposition steps, e.g., reflective layer (such as aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated IMOD formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6A and 8E. The cavity 19 may be formed by exposing the sacrificial material 25 (deposited at block 84) to an etchant. For example, an etchable sacrificial material such as molybdenum (Mo) or amorphous silicon (Si) may be removed by dry chemical etching, e.g., by exposing the sacrificial layer 25 to a gaseous or vaporous etchant, such as vapors derived from solid XeF2 for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9:
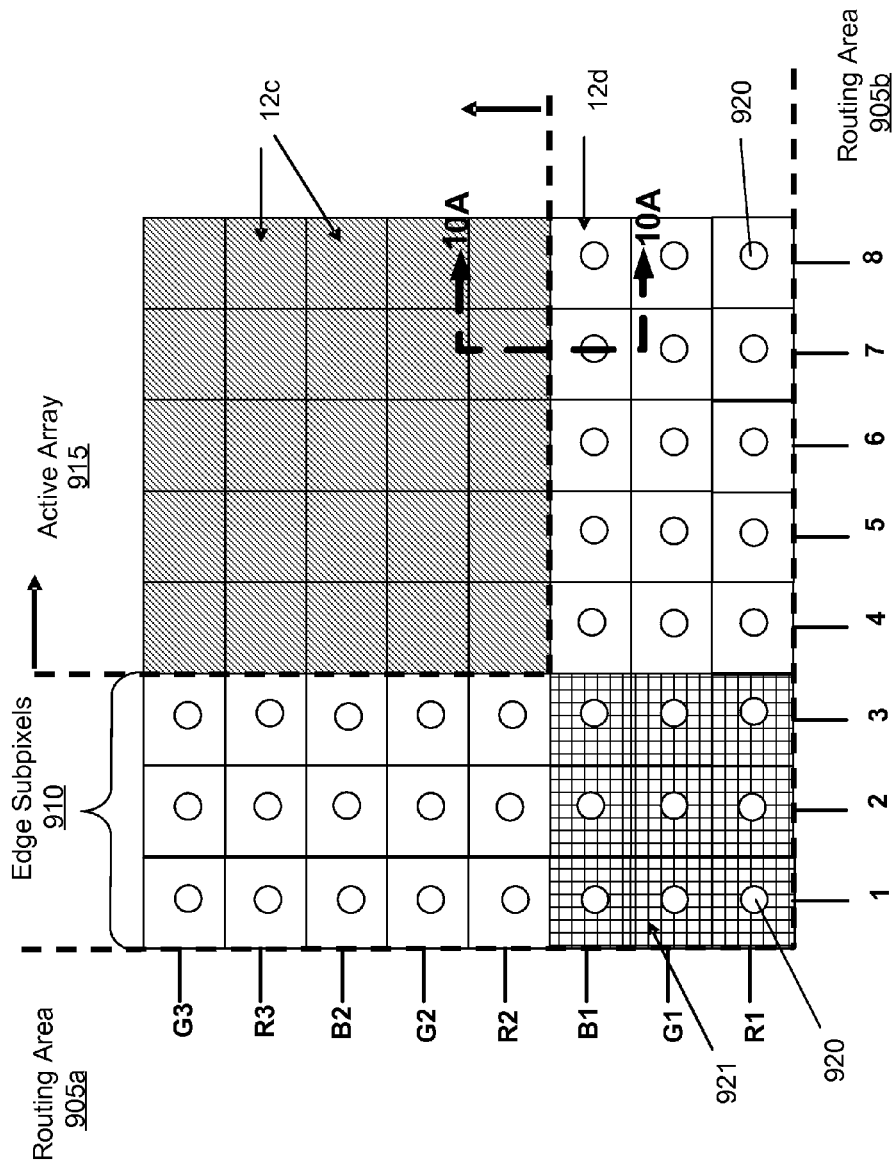
FIG. 9 shows an example of a display that includes an edge subpixel array having openings as provided herein.

FIG. 9 shows an example of a display that includes an edge subpixel array having openings as provided herein. In this example, each row includes subpixels of the same type. For example, the bottom row illustrates red subpixels 1 through 8. However, the number and arrangement of the subpixels shown in FIG. 9 is only an example. Other implementations may have different colors, numbers and/or arrangements of subpixels. The edge subpixel array 910 provides electrical connectivity between the routing areas 905a and 905b, and the active subpixel array 915. In this example, the active subpixel array 915 is formed of the IMODs 12c, which may be substantially similar to those described above with reference to FIG. 1, 6A-6E or 8A through 8E.

In some implementations, the rows G1, R1 and B1 are not driven. Similarly, the columns 1 through 3 may not be driven. Instead, the nine "corner" subpixels 921 in this area may all be interconnected. This configuration may result in a significant voltage change at the interface between the edge subpixel array 910, the corner subpixels 921 and the active subpixel array 915, e.g., between the edge subpixels B1 and G2 in column 3, because the drive signals for driving the active subpixel array 915 are going through the edge subpixel G2. The routing area 905a, through which relatively large drive voltages are applied, may sometimes be referred to herein as the "common." Relatively smaller drive voltages are applied in the routing area 905b, which is also known as the "segment." In prior implementations, the relatively large voltages that were applied in the common routing area actuated the edge subpixels 910 that were disposed between the common routing area and the active subpixel array 915. This caused some power to be consumed pointlessly and caused other problems, such as needless complication of the drive schemes, the need to mask the edge subpixels 910, e.g., with a black mask layer or the larger number of outputs in the driver including those dedicated to driving edge "dummy" pixels.

In order to address these problems, in the implementation shown in FIG. 9 the edge subpixel array 910 is formed of IMODs 12d, each of which includes an opening 920. Such configurations can prevent the IMODs 12d from actuating. However, the configuration shown in FIG. 9 is merely an example. In alternative implementations, for example, some edge subpixels (e.g., some of the corner subpixels 921) may not include an opening 920.

Figure 10A:
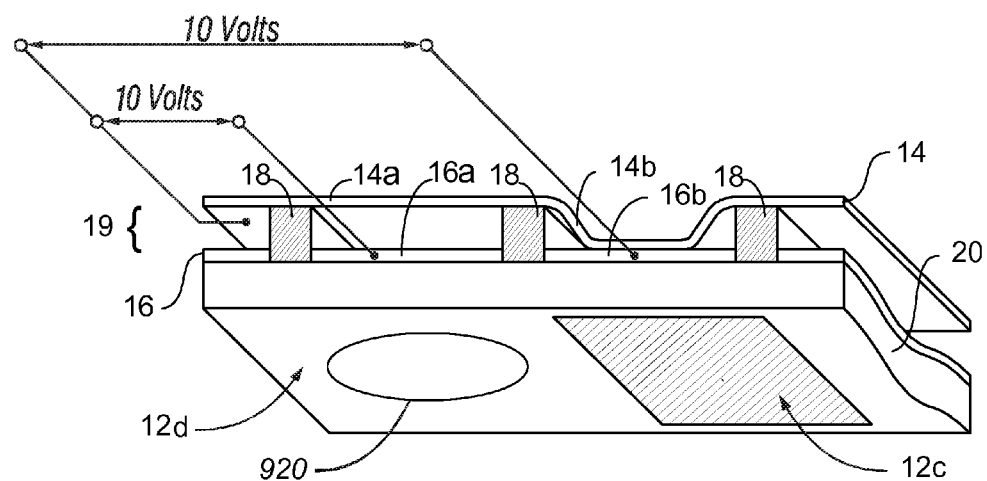
FIG. 10A shows an example of an isometric view depicting two adjacent subpixels in an IMOD display device.

FIG. 10A shows an example of an isometric view depicting two adjacent subpixels in an IMOD display device. The orientation of FIG. 10A may be determined by reference to the dashed lines on the right side of FIG. 9. As shown in FIG. 9, the subpixel 12d of FIG. 10A is part of the edge subpixel array 910 and the subpixel 12c of FIG. 10A is part of the active subpixel array 915. In FIG. 10A, the opening 920 through the optical stack 16 may be seen through the substantially transparent substrate 20. In this implementation, the opening 920 is large enough to prevent the edge subpixel 12d from actuating when an array driver is applying an active subpixel actuation voltage to the active subpixel array 915 via the edge subpixels 910. The opening 920 may cause the edge subpixel 12d to have an edge subpixel actuation voltage that is higher than the active subpixel actuation voltage. Because the openings 920 prevent the edge subpixels 12d from actuating, in this example the IMODs 12d do not consume power when the active area is being driven.

The opening 920 may allow ambient light to reflect directly from the second conductive and reflective layer 14 of the edge subpixel 12d and emerge from the edge subpixel 12d via the opening 920. The opening 920 may cause the edge subpixels to have a first reflectivity that is substantially similar to a second reflectivity of the routing area, which may have a reflectivity in the range of, e.g., 20%-30%. In some implementations, a size of the opening 920 may be selected to produce a reflectivity difference between the edge subpixel area reflectivity and the routing area reflectivity that is less than or equal to a desired reflectivity difference, e.g., 5% or less.

Figure 10B:
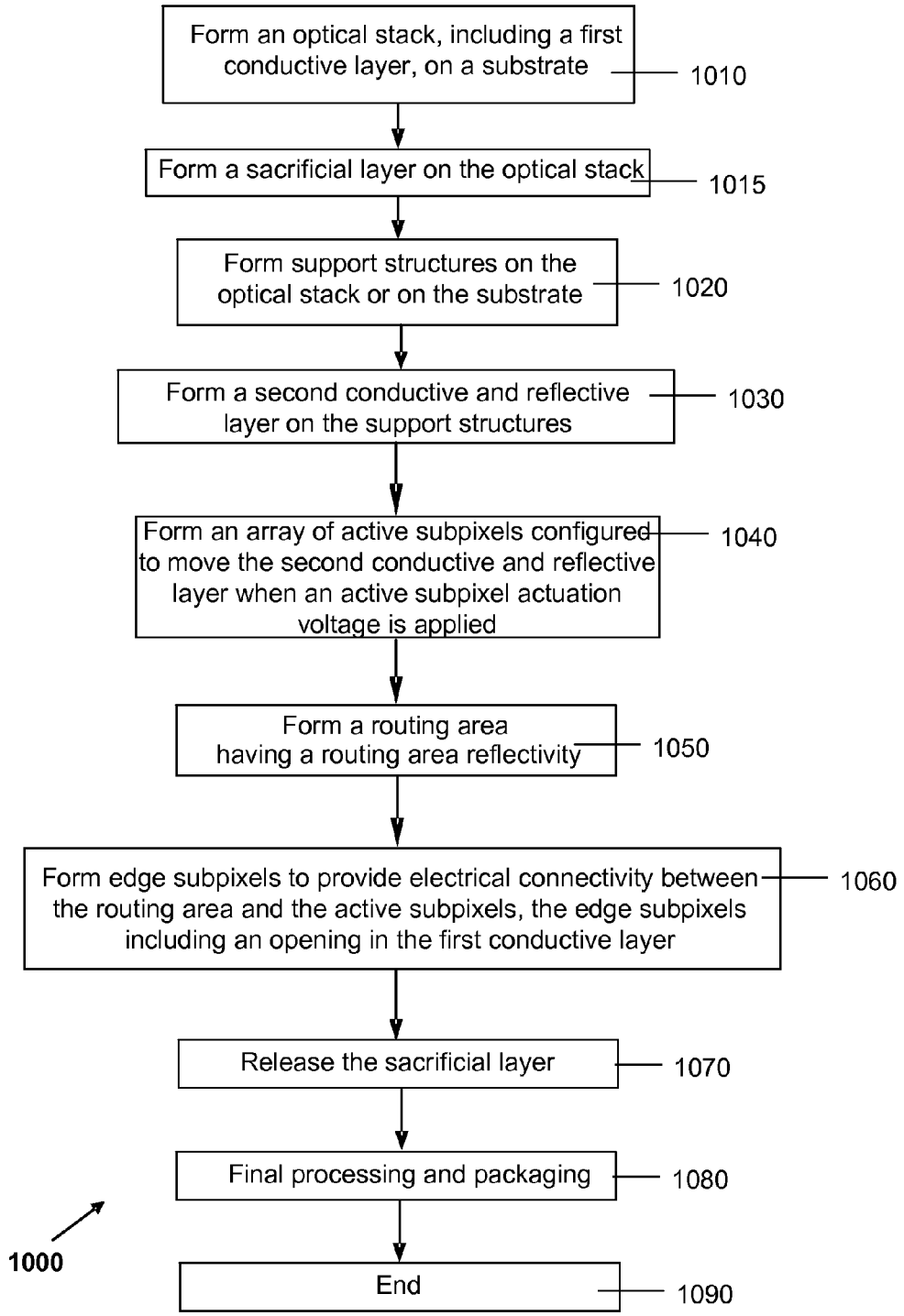
FIG. 10B shows an example of a flow diagram illustrating a process of fabricating displays according to some implementations provided herein.

FIG. 10B shows an example of a flow diagram illustrating a process of fabricating displays according to some implementations provided herein. The blocks of process 1000, like those of other processes described herein, are not necessarily performed in the order indicated. Alternative implementations of process 1000 may involve more or fewer blocks than are shown in FIG. 10B.

In block 1010, an optical stack is formed on a substantially transparent substrate. FIG. 10A illustrates one example of an optical stack 16 formed over a substrate 20. The substrate 20 may be a transparent substrate such as glass or plastic. In this example, the optical stack 16 is partially transparent and partially reflective, and includes a first conductive layer. The optical stack 16 may be fabricated, for example, by depositing one or more layers having the desired properties onto the transparent substrate 20.

As noted above, the first conductive layer of optical stack 16 can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD, such as a conductive layer of a black mask) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into substantially parallel strips, and may form row electrodes in a display such as those shown and described elsewhere herein. Referring to FIG. 9, for example, one such row electrode may form part of the red subpixel row R2 and may be configured to convey signals from the routing area 905a to the red subpixels in the row R2 of the active subpixel array 915.

In block 1015 of process 1000, one or more sacrificial layers are formed on the optical stack. The sacrificial layer is later removed (at block 1070) to form a cavity. Therefore, the sacrificial layer is not shown in FIG. 10A.

In block 1020 of FIG. 10B, support structures are formed on the optical stack 16. Block 1020 may involve forming a post 18 such as that as illustrated in FIG. 10A. The formation of the post 18 may include patterning the sacrificial layer to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer and the optical stack 16 to the underlying substrate 20, so that the lower end of the post 18 contacts the substrate 20 as illustrated in FIG. 10A. Alternatively, as depicted in FIG. 8C, the aperture formed in the sacrificial layer may extend through the sacrificial layer, but not through the optical stack 16.

In block 1030, a second conductive and reflective layer is formed on the support structures. One example of the second conductive layer is the layer 14 of FIG. 10A. The layer 14 may be formed by employing one or more deposition processes, along with one or more patterning, masking, and/or etching processes. In some implementations, the layer 14 may include a plurality of sub-layers.

In some implementations, a highly conductive and reflective material, such as aluminum or silver, may be used to form the layer 14. The layer 14 may be formed as a series of substantially parallel strips of a deposited metal layer or layers to form column electrodes in a display device. Such column electrodes may be substantially orthogonal to the row electrodes of the optical stack 16. Referring to FIG. 9, for example, one such column electrode may form part of subpixel column 4 and may be configured to convey signals from the routing area 905b to the subpixels in column 4 of the active subpixel array 915.

Although blocks 1040, 1050 and 1060 are shown as sequential blocks in FIG. 10B, in some implementations they may be performed at substantially the same time. For example, blocks 1040, 1050 and 1060 may be performed as the corresponding features are formed on different areas of a substrate at substantially the same time. In block 1040, an array of active subpixels is formed. Active subpixel array 915 of FIG. 9 provides an example of one such array. Active subpixel array 915 may be composed of subpixels 12c, which may be similar to the subpixel 12c of FIG. 10A. The subpixels 12c may be configured to move the layer 14 when an active subpixel actuation voltage is applied between the layer 14 and the layer 16.

In this example, a routing area is formed in block 1050. The routing area may be used to supply power and to connect various devices, such as the array driver 22, the driver controller 29 and/or the processor 21 described below with reference to FIGS. 12A and 12B, to the subpixel array. The routing area may be similar to routing areas 905a and 905b that are shown in FIG. 9. The routing area may have a routing area reflectivity that depends on various factors, including the reflectivity of the conductive material used in the routing area, the reflectivity of the background area (e.g., of an underlying substrate) and the percentage of the routing area that is occupied by the conductive material. In some implementations, the routing area reflectivity may be in the range of 20% to 40%.

In block 1060, edge subpixels are formed. These edge subpixels may be configured to provide electrical connectivity between the routing area and the active subpixels. In this example, at least some of the edge subpixels include an opening in the first conductive layer. The opening may be defined in a mask and formed by patterning techniques in manufacturing process. The opening may, for example, be similar to one of the openings 920 shown in the subpixels 12d of FIGS. 9 and 10A. In some implementations, the size of the opening may be a minimum opening size to prevent the second conductive layer 14 of the edge subpixels 12d from actuating when an actuation voltage is applied to the active subpixels 12c via the edge subpixels 12d. The size of the opening may be selected according to additional criteria, as described below with reference to FIG. 11.

In block 1070, the sacrificial layer is released to form an optical cavity between the optical stack 16 and the reflective and conductive layer 14. In the subpixels 12c of the active subpixel array, the reflective and conductive layer 14 of each active subpixel may be configured to be movable relative to the optical stack 16 when an actuation voltage is applied between the first conductive layer and the second conductive layer.

In block 1080, final processing and packaging operations may be performed. For example, individual displays may be singulated. Processors, driver controllers, etc., may be electrically connected with the routing area. The resulting display devices may be incorporated into a portable device, e.g., a device such as that described below with reference to FIGS. 12A and 12B. In this example, the process ends in block 1090.

Figure 11:
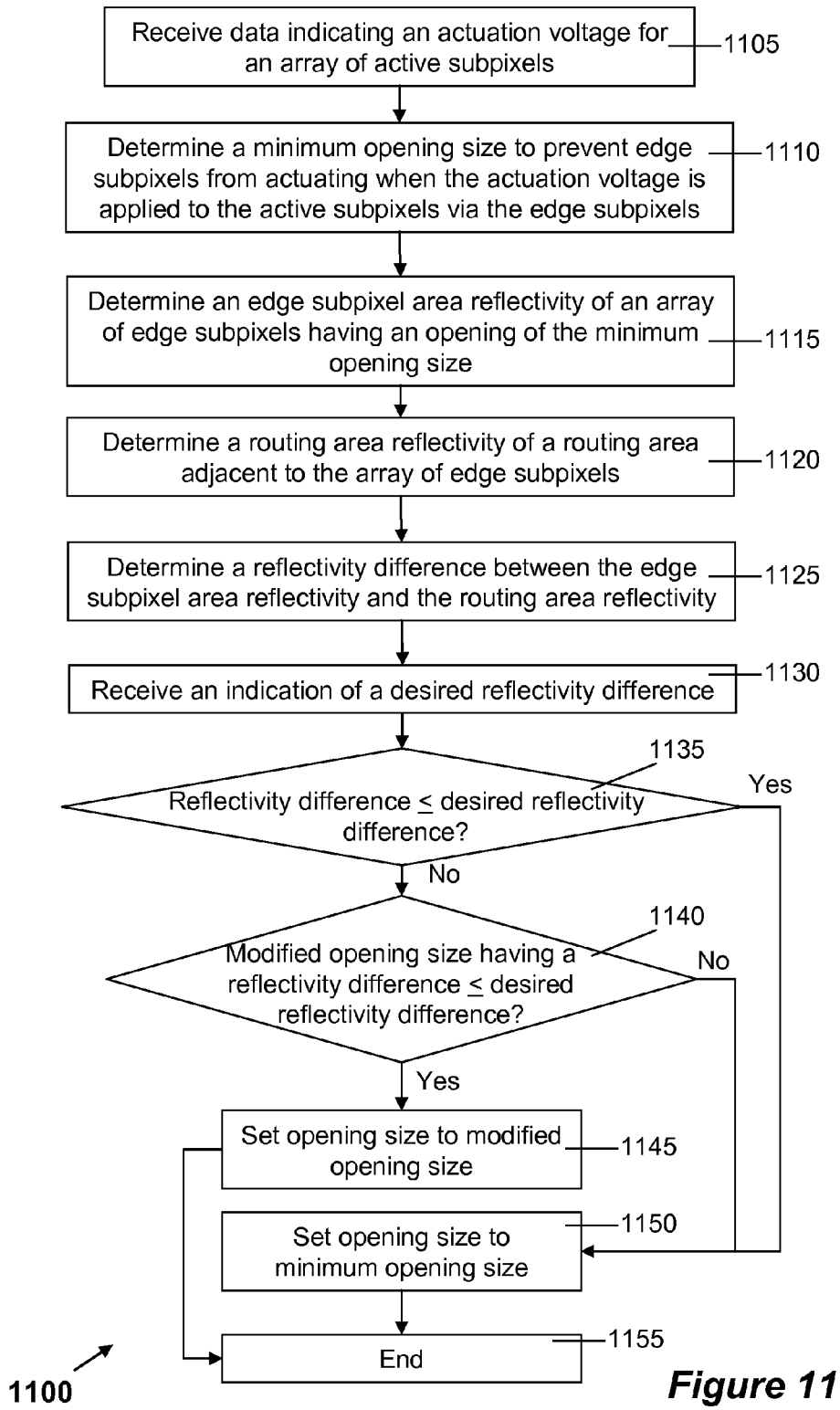
FIG. 11 shows an example of a flow diagram illustrating a process of determining an opening size for edge subpixels.

FIG. 11 shows an example of a flow diagram illustrating a process of determining an opening size for edge subpixels. This process may be performed, for example, by software encoded in a non-transitory medium. The software may include instructions for controlling at least one device to perform the operations of process 1100. The blocks of process 1100 are not necessarily performed in the order indicated. Alternative implementations of process 1100 may involve more or fewer blocks than are shown in FIG. 11.

In block 1105, data are received that indicate an actuation voltage for an array of active subpixels, such as the active subpixel array 915 of FIG. 9. In some implementations, the actuation voltage may be on the order of 10 volts, e.g., between 5 and 20 volts. Referring to FIG. 10A, for example, an actuation voltage of 10 volts is being applied to subpixels 12c and 12d.

Block 1110 may involve determining an opening size that causes the edge subpixels to have an edge subpixel actuation voltage that is higher than the active subpixel actuation voltage by a predetermined amount, e.g. by 2 or 3 volts. Referring again to FIG. 10A, for example, the actuation voltage of 10 volts is not sufficient to cause edge subpixel 12d to actuate. Block 1110 may involve determining the minimum size of opening 920 (e.g., within a tolerance range) to prevent edge subpixel 12d from actuating when the actuation voltage of 10 volts is being applied to the active subpixel array 915 via the edge subpixel array 910 (see FIG. 9). In some implementations, the opening 920 may occupy between 15% and 60% of the total area of an edge subpixel.

In this implementation, block 1115 involves determining an edge subpixel area reflectivity of an array of edge subpixels having an opening of the minimum opening size. In block 1120, a routing area reflectivity of a routing area adjacent to the array of edge subpixels may be determined. The routing area reflectivity may depend on various factors, including the reflectivity of the conductive material used in the routing area, the reflectivity of the background area (e.g., of an underlying substrate) and the percentage of the routing area that is occupied by the conductive material. In some implementations, block 1115 may involve receiving routing area reflectivity information after it has been determined, whereas in other implementations block 1115 may involve determining routing area reflectivity information, e.g., via reflectivity measurement, averaging reflectivity measurements taken over the routing area, etc.

A reflectivity difference between the edge subpixel area reflectivity and the routing area reflectivity may then be determined, e.g., via subtraction of one value from the other (block 1125). An indication of a desired reflectivity difference may be received in block 1130. For example, such information may be received via a user interface in response to user input, may be received via a network interface, etc.

In block 1135, it may be determined whether the reflectivity difference is less than or equal to the desired reflectivity difference. For example, some implementations may involve determining whether the desired reflectivity difference is 5% or less. If so, the minimum opening size provides a suitable reflectivity for the edge subpixel area. Therefore, the opening size may be set to the minimum opening size.

However, if it is determined in block 1135 that the reflectivity difference is greater than the desired reflectivity difference, the process continues to block 1140. In block 1140, it may be determined whether there is a suitable modified opening size that would produce a reflectivity difference less than or equal to the desired reflectivity difference. For example, the edge subpixel reflectivity may increase as the opening size increases. However, there may be an opening size that is a maximum feasible opening size to form in the edge subpixels. If there is a modified opening size that is greater than the minimum opening size and less than or equal to the maximum feasible opening size and which would produce a reflectivity difference less than or equal to the desired reflectivity difference, this may be determined in block 1140. The opening size could be set to this modified opening size (block 1145).

However, if there is not a modified opening size that is greater than the minimum opening size and less than or equal to the maximum feasible opening size that would produce a reflectivity difference less than or equal to the desired reflectivity difference, the opening size could be set to a default size. In this example, the default size is the minimum opening size (block 1150). In alternative implementations, the default size may be the maximum feasible opening size or a predetermined opening size between the minimum opening size (such as 10% to 20% of the overall edge subpixel area) and the maximum feasible opening size (such as 50% to 60% of the overall edge subpixel area). In this example, the process ends in block 1155.

Figure 12A:
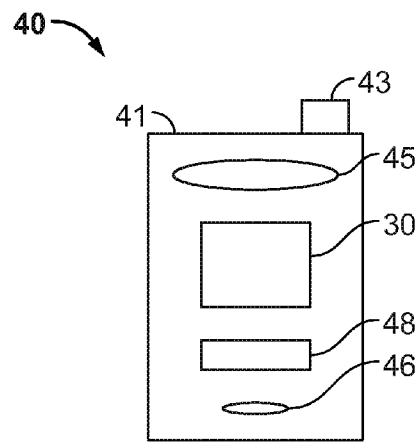
FIGS. 12A and 12B show examples of system block diagrams illustrating a display device that includes a plurality of IMODs.
Figure 12B:
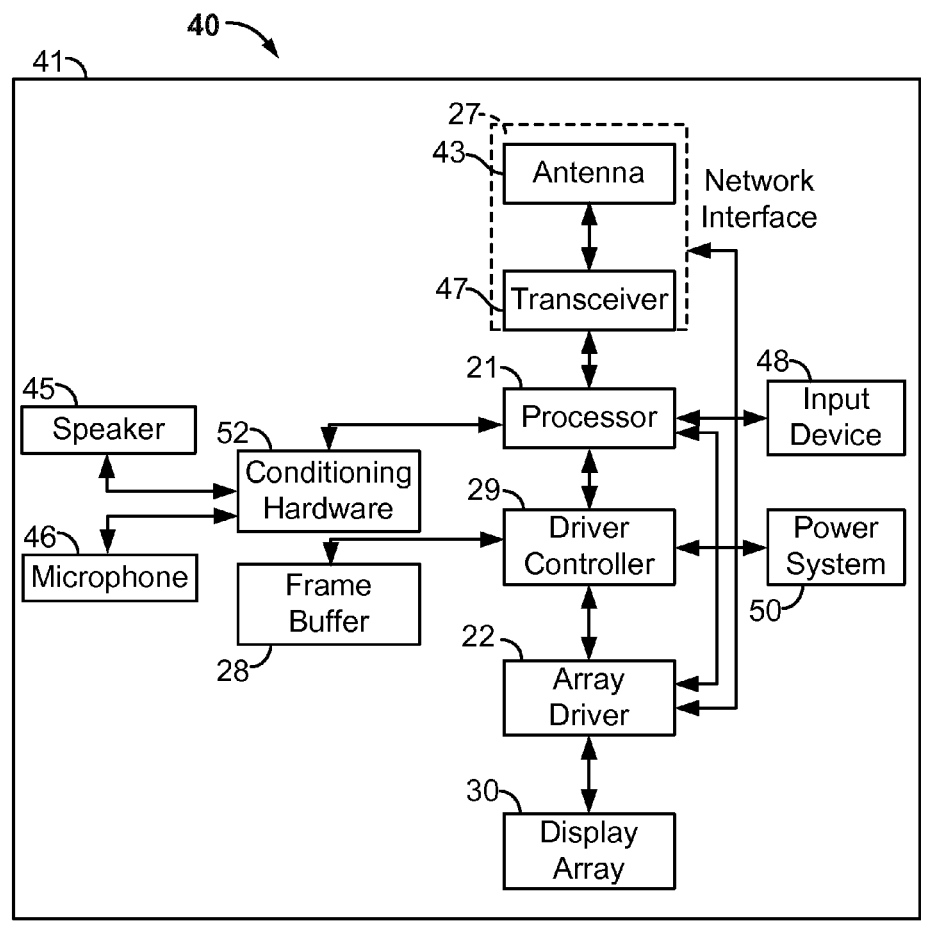

FIGS. 12A and 12B show examples of system block diagrams illustrating a display device 40 that includes a plurality of IMODs. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD display, as described herein.

The components of the display device 40 are schematically illustrated in FIG. 12B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power system 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone integrated circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or other small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power system 50 can include a variety of energy storage devices. For example, the power system 50 may include a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power system 50 also can include a renewable energy source, a capacitor, or a solar cell, including a plastic solar cell or solar-cell paint. The power system 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations. The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
a routing area;
an active subpixel array including a plurality of active subpixels;
an array driver; and
an edge subpixel array including a plurality of edge subpixels configured to provide electrical connectivity between the routing area and the active subpixel array, each of the edge subpixels and the active subpixels including a first conductive layer and a second conductive and reflective layer, the first conductive layer of the edge subpixels having an opening formed therein, the opening being large enough to prevent the edge subpixels from actuating when the array driver is applying an active subpixel actuation voltage to the active subpixel array via the edge subpixels.

2. The apparatus of claim 1, wherein the opening causes the edge subpixels to have an edge subpixel actuation voltage that is higher than the active subpixel actuation voltage.

3. The apparatus of claim 1, wherein the opening allows ambient light to reflect directly from the second conductive and reflective layer of the edge subpixels and emerge from the edge subpixels.

4. The apparatus of claim 1, wherein the opening causes the edge subpixels to have a reflectivity that is substantially similar to a reflectivity of the routing area.

5. The apparatus of claim 1, further comprising:
a display;
a processor that is configured to communicate with the display, the processor being configured to process image data; and
a memory device that is configured to communicate with the processor.

6. The apparatus of claim 5, further comprising:
a driver circuit configured to send at least one signal to the display; and
a controller configured to send at least a portion of the image data to the driver circuit.

7. The apparatus of claim 5, further comprising:
an image source module configured to send the image data to the processor, wherein the image source module includes at least one of a receiver, transceiver, and transmitter.

8. The apparatus of claim 5, further comprising:
an input device configured to receive input data and to communicate the input data to the processor.

9. A method, comprising:
forming an optical stack over a substrate, the optical stack including a first conductive layer;
forming a plurality of support structures on the optical stack or on the substrate;
forming a second conductive and reflective layer on the support structures;
forming an array of active subpixels that include the first conductive layer, the support structures and the second conductive and reflective layer such that the second conductive and reflective layer is movable between a first position and a second position when an active subpixel actuation voltage is applied to the active subpixels;
forming a routing area outside the array of active subpixels; and
forming an edge subpixel array including rows and columns of edge subpixels, the edge subpixels configured to provide electrical connectivity between the routing area and the active subpixels, each of the edge subpixels including the first conductive layer, the second and reflective conductive layer and the support structures, the edge subpixels further including an opening in the first conductive layer, the opening being large enough to prevent the edge subpixels from actuating when the actuation voltage is applied to the active subpixels.

10. The method of claim 9, wherein the process of forming the edge subpixel array includes forming the opening in each edge subpixel.

11. The method of claim 9, wherein the process of forming the edge subpixel array includes forming the openings to prevent the edge subpixels from modulating incident light.

12. The method of claim 11, wherein the routing area has a routing area reflectivity and wherein the process of forming the edge subpixel array includes forming the opening to make the edge subpixel area reflectivity substantially match the routing area reflectivity.

13. A non-transitory medium having software encoded thereon, the software including instructions for controlling at least one device to perform operations comprising:
receiving data indicating an actuation voltage for an array of active subpixels; and
determining a size of an opening in a first conductive layer of a plurality of edge subpixels that include the first conductive layer and a second conductive layer, the edge subpixels configured for electrical connectivity with the active subpixels, wherein the determining involves determining a minimum opening size to prevent the edge subpixels from actuating when the actuation voltage is applied to the active subpixels via the edge subpixels.

14. The non-transitory medium of claim 13, wherein the software includes instructions for controlling the at least one device to perform operations comprising:
determining an edge subpixel area reflectivity of an array of edge subpixels each having an opening of the minimum opening size.

15. The non-transitory medium of claim 14, wherein determining the edge subpixel area reflectivity involves calculating the edge subpixel area reflectivity.

16. The non-transitory medium of claim 14, wherein determining the edge subpixel area reflectivity involves receiving data indicating the edge subpixel area reflectivity.

17. The non-transitory medium of claim 14, wherein the software includes instructions for controlling the at least one device to perform operations comprising:
determining a routing area reflectivity of a routing area adjacent to the array of edge subpixels.

18. The non-transitory medium of claim 17, wherein the software includes instructions for controlling the at least one device to perform operations comprising:
determining a reflectivity difference between the edge subpixel area reflectivity and the routing area reflectivity.

19. The non-transitory medium of claim 18, wherein the software includes instructions for controlling the at least one device to perform operations comprising:

receiving an indication of a desired reflectivity difference; and determining whether the reflectivity difference is greater than, less than or equal to the desired reflectivity difference.

20. The non-transitory medium of claim 19, wherein it is determined that the reflectivity difference is greater than the desired reflectivity difference, wherein the software includes instructions for controlling the at least one device to perform operations comprising:

determining whether there is a modified opening size that would yield a reflectivity difference that is less than or equal to the desired reflectivity difference.

21. The non-transitory medium of claim 20, wherein it is determined that there is a modified opening size that would yield a reflectivity difference that is less than or equal to the desired reflectivity difference, wherein the software includes instructions for controlling the at least one device to perform operations comprising:

determining whether the modified opening size is greater than or equal to the minimum opening size.

22. An apparatus, comprising:

a routing area having a routing area reflectivity;

active subpixel means for controlling an optical cavity, the active subpixel means including a first conductive layer, a second conductive and reflective layer and means for controlling an optical cavity by moving the second conductive and reflective layer from a first position to a second position; and edge subpixel means for providing electrical connectivity between the routing means and the active subpixel means, the edge subpixel means including reflectivity modulation means for causing a reflectivity difference between an edge subpixel area reflectivity and the routing area reflectivity to be less than or equal to a desired reflectivity difference, the reflectivity modulation means including openings in the first conductive layer of edge subpixels in the edge subpixel area, the openings being large enough to prevent the edge subpixel means from actuating when an active subpixel actuation voltage is applied to the active subpixel means via the edge subpixel means.

* * * * *